United States Patent [19]
Saitoh et al.

[11] Patent Number: 6,153,546
[45] Date of Patent: Nov. 28, 2000

[54] ULTRALOW-LOSS SILICA GLASS AND OPTICAL FIBERS USING THE SAME

[75] Inventors: Kazuya Saitoh; Akira Ikushima, both of Nagoya, Japan

[73] Assignees: Toyota Jidosha Kabushiki Kaisha, Toyota; Toyota School Foundation, Nagoya, both of Japan

[21] Appl. No.: 09/229,582

[22] Filed: Jan. 13, 1999

Related U.S. Application Data

[63] Continuation of application No. PCT/JP97/02427, Jul. 14, 1997.

[30] Foreign Application Priority Data

Jul. 16, 1996 [JP] Japan ................................ 8-186353

[51] Int. Cl.[7] ............................. C03C 13/04; C03C 3/06
[52] U.S. Cl. .............................................. 501/37; 501/54
[58] Field of Search ..................... 501/37, 54; 385/142, 385/144

[56] References Cited

U.S. PATENT DOCUMENTS

| | | |
|---|---|---|
| 3,971,645 | 7/1976 | Bachmann et al. . |
| 4,013,436 | 3/1977 | Van Der Steen . |
| 4,666,247 | 5/1987 | Mac Chesney et al. . |
| 5,146,534 | 9/1992 | Lines ..................................... 385/142 |
| 5,212,757 | 5/1993 | Brownlow et al. ..................... 385/144 |
| 5,262,365 | 11/1993 | Oyobe et al. .............................. 501/37 |
| 5,655,046 | 8/1997 | Todoroki et al. ....................... 385/144 |
| 5,763,340 | 6/1998 | Nishii et al. .............................. 501/54 |

FOREIGN PATENT DOCUMENTS

| | | |
|---|---|---|
| 173 961 | 3/1986 | European Pat. Off. . |
| 542 476 A1 | 5/1993 | European Pat. Off. . |
| 58-49637 | 3/1983 | Japan . |
| 63-195147 | 8/1988 | Japan . |
| 5-105483 | 4/1993 | Japan . |
| 5-294670 | 11/1993 | Japan . |
| 6-232489 | 8/1994 | Japan . |
| 8-198637 | 8/1996 | Japan . |
| 8-198640 | 8/1996 | Japan . |

OTHER PUBLICATIONS

Senior, "Linear Scattering Losses", Optical Fiber Communications: Principles and Practice, 1985, Prentice–Hall International Inc., London GB XP002110413, pp. 68–73. No Month.

Lines, "Can the Minimum Attenuation of Fused Silica be Significantly Reduced by Small Compositional Variations? I. Alkali Metal Dopants", Journal of Non–Crystalline Solids, vol. 171, No. 3, Aug. 2, 1994, pp. 209–218, XP000486704, North–Holland Physics Publishing, Amsterdam, NL..

Lines, "Can the Minimum Attenuation of Fused Silica be Significantly Reduced by Small Compositional Variations? II. Combined Fluorine and Alkali Metal Dopants", Journal of Non–Crystalline Solids, vol. 171, No. 3, Aug. 2, 1994, pp. 219–227, XP002110412, North–Holland Physics Publishing, Amsterdam, NL..

New Glass vol. 10, No. 3 (1995) A review on recent studies on optical fibers–pursuing low attenuation, Shin–ichi todoroki, pp. 3–7.

*Primary Examiner*—Karl Group
*Attorney, Agent, or Firm*—Pillsbury Madison & Sutro LLP

[57] ABSTRACT

This ultralow-loss glass is characterized in that high purity silica glass contains 1 to 500 wt.ppm of at least one network modifying oxide. It is assumed that the network modifying oxide appropriately loosens the tetrahedral network structure of silica and hence Rayleigh scattering is decreased. Examples of the network modifying oxide include $Na_2O$, $K_2O$, $Li_2O$, $MgO$, $CaO$, and $PbO$. Since Rayleigh scattering losses are minimal in comparison with those of high purity silica glass, this impurity-added silica glass is excellent as a base material of a glass fiber for a long-distance transmission.

2 Claims, 1 Drawing Sheet

ULTRALOW-LOSS SILICA GLASS AND OPTICAL FIBERS USING THE SAME

This is a CON of PCT/JP97/02427, Jul. 14, 1997.

TECHNICAL FIELD

This invention relates to impurity-added silica glass from which ultralow-loss optical fibers, etc. can be produced, and optical fibers produced by using this impurity-added silica glass.

BACKGROUND ART

In general, followings can be listed as factors of light transmission loss of optical fibers.

(1) Loss inherent in materials constituting optical fibers, such as Rayleigh scattering and infrared absorption loss.

(2) Scaterring loss due to fiber structure imperfection and glass flaws, such as scattering by irregularities of the interface of a core and a cladding, strias and bubbles.

(3) Absorption loss by impurities remained in fibers, such as absorption by iron and other transition metals, absorption by intermolecular vibration of hydroxyl group.

Silica optical fibers, which are currently in wide practical use, are free from losses caused by external factors mentioned in (2) and (3). When high purity silica glass is used as a core, it becomes possible to produce fibers with losses close to the theoretical limit of 0.15 dB/km. However, since the age of internet and other multimedia is coming, it is required to develop fibers with losses less than those of silica fibers, in order to reduce communication costs by increasing the repeater span and to enlarge communications networks, and studies save been construed both inside and outside Japan.

In the stage of developing materials, it has been especially demanded to decrease Rayleigh scattering, which is the main cause of loss, and efforts have been made to find multi-component glass with minimal Rayleigh scattering. For example, Japanese Unexamined Patent Publication (KOKAI) No.105483/1993 discloses a large number of multi-component glasses which can lessen density fluctuations, which are the main cause of Rayleigh scattering. It has been expected that multi-component glasses can realize superior fibers than silica fibers, but, at present, none of the multi-component glasses are practically used as fibers for long distance communication.

The multi-component glasses have following disadvantages:

(1) Density fluctuations are increased and hence, light scattering losses are increased, in comparison with one-component glass.

(2) Degree of crystallinity is high and microcrystallization in spinning fibers is hard to be controlled, and therefore light transmittance is degraded in comparison with one-component glass.

(3) It is difficult to control impurities which absorb light with wavelengths used currently for communications, such as hydroxyl group and transition metals, and transmission losses are increased.

It is an object of the present invention to obviate the disadvantages of multi-component glasses and produce glass materials which can be produced into optical fibers with minimal losses, which cannot be realized by optical fibers formed of the conventional silica glasses, especially optical fibers which have superior Rayleigh scattering loss characteristics.

DISCLOSURE OF THE INVENTION

The present inventors have found that addition of a very small amount of $Na_2O$ to silica glass decreases Rayleigh scattering losses and have completed the present invention.

The ultralow-loss glass of the present invention is characterized in that silica glass contains at least one network modifying oxide, such as $Na_2O$, in an amount of 1 to 500 wt.ppm. It is assumed that the network modifying oxide appropriately loosens the tetrahedral network structure of silica and hence that Rayleigh scattering losses are decreased.

The ultralow-loss glass of the present invention comprises silica glass and at least one network modifying oxide which is uniformly dispersed in the silica glass on the atom order. High purity silica glass is used as the silica glass.

The network modifying oxide added to silica glass is in an amount of 1 to 500 wt.ppm. The modifying oxide thus added in a very small amount should be regarded as a very small amount of impurities in one-component silica glass rather than as a constitutional component of multi-component glass. The ultralow-loss glass of the present invention can obviate the disadvantages of the conventional multi-component glass.

Examples of the above network modifying oxide include $Na_2O$, $K_2O$, $Li_2O$, $MgO$, $CaO$, and $PbO$, and at least one of them is selected. This glass has minimal Rayleigh scattering in comparison with high purity silica glass, and when used as optical fiber materials, this glass can offer optical fibers with losses less than those of the conventional silica optical fibers.

As the cause of a decrease in Rayleigh scattering, following two are assumed.

(1) The glass transition temperature is lowered, and as a result, scattered light intensity, which is considered to be proportional to the glass transition temperature, is also decreased.

(2) Owing to diffusion of the modifying oxide, freezed density fluctuations, which are the cause of light scattering, are promoted to be lessened, and consequently, scattered light intensity is decreased.

When the content of the network modifying oxide is less than 1 wt. ppm, the decrease in Rayleigh scattering is hardly observed. When the content exceeds 500 wt.ppm, the disadvantages of the multi-component glass cannot be obviated and hence low-loss optical fibers cannot be realized.

The ultra-low loss glass of the present invention can be used as a core, or as a core and a cladding of an optical fiber.

In the ultra-low loss glass of the present invention, the tetrahedral structure of silica glass is loosened by the network modifying oxide and Rayleigh scattering is reduced. Therefore, the ultralow-loss glass of the present invention can stably transmit light for a longer distance, and when the ultralow-loww glass of the present invention is used as optical fibers, the repeater span can be increased.

BEST MODE FOR CARRYING OUT THE INVENTION

Figure 1:
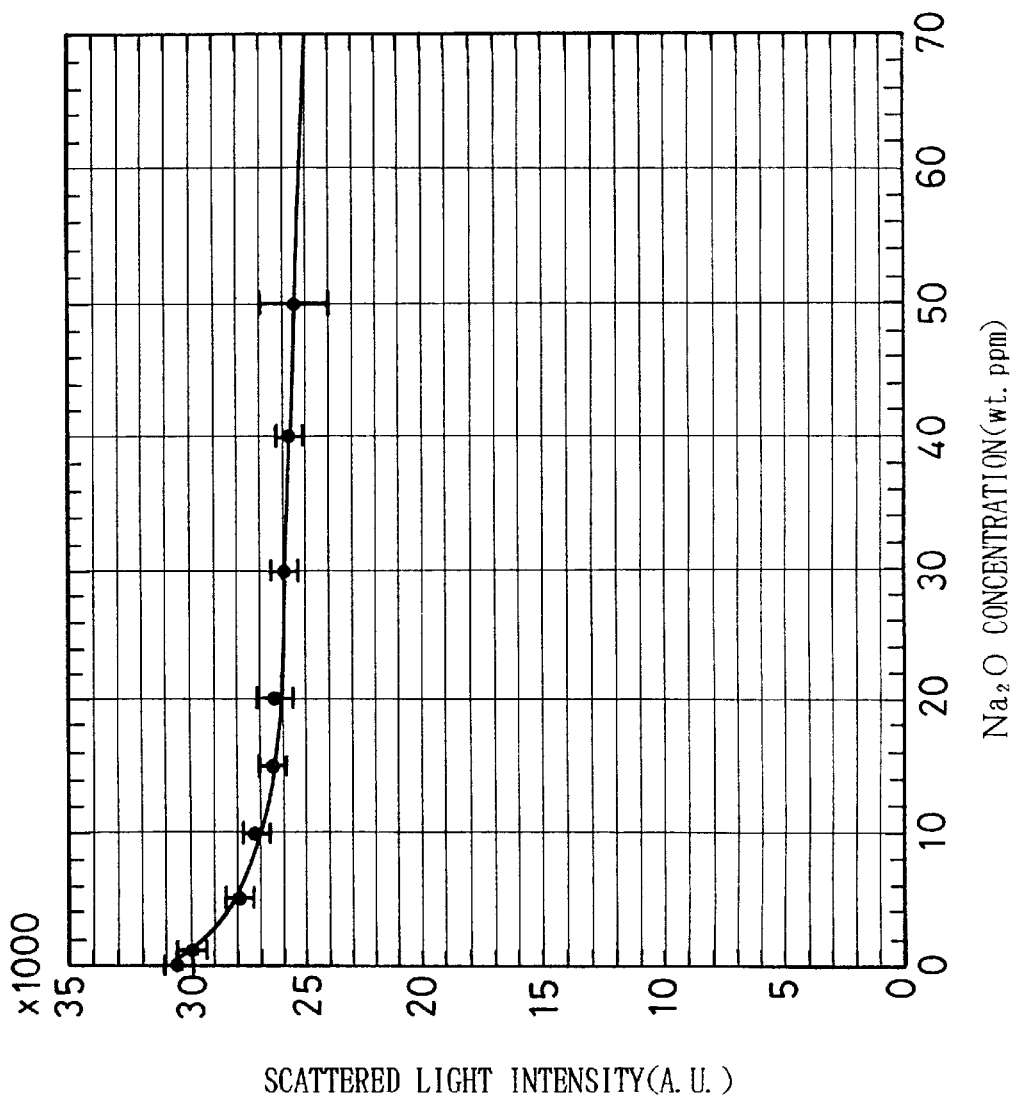
FIG. 1 is a graph showing the relationship between the amounts of $Na_2O$, added to ultralow-loss silica glass and scattered light intensity in Examples 1 to 8 and Comparative Example.

Hereinafter, the present invention will be concretely discussed by way of examples, but this invention should not be limited to these examples.

EXAMPLE 1

Na ions were implanted into a high purity silica glass specimen containing 0.01 ppm or less metal impurities (Al, Ca, Cu, Fe, Na, K, Li, Mg, Mn, and Ti) by an ion implantation apparatus, to prepare a specimen of this example. The specimen dimensions were 20×10×1 mm$^3$ and the amount of Na ions implanted was $4.2 \times 10^{17}$ cm$^{-2}$. As a result, the concentration of Na$_2$O in the silica glass became 50 ppm. After that, the Na ion-implanted specimen was subjected to a diffusion treatment of heating at 600° C. for 24 hours. Thus, ultralow-loss glass of this example was obtained.

Scattered light intensity of the ultralow-loss glass of this example at a scattering angle of 90° was measured by employing an argon laser of 488 nm. The scattered light intensity at room temperature is shown in FIG. 1 and Table 1.

In FIG. 1, the axis of ordinate shows scattered light intensity and the axis of abscissa shows the amount of Na$_2$O added.

COMPARATIVE EXAMPLE 1

High purity silica glass containing 0.01 ppm or less metal impurities (Al, Ca, Cu, Fe, Na, K, Li, Mg, Mn, and Ti) was used, as it was, as a specimen of Comparative Example. Scattered light intensity of the specimen of Comparative Example 1 was measured in the same way as in Example 1. The scattered light intensity at room temperature is also shown in FIG. 1 and Table 1.

EXAMPLES 2 TO 8

Na ions were implanted into high purity silica glass specimens containing 0.01 ppm or less metal impurities (Al, Ca, Cu, Fe, Na, K, Li, Mg, Mn, Ti) in the same way as in Example 1, and the respective specimens with Na$_2$O concentrations of 40, 30, 20, 15, 10, 5, 1 ppm were thus prepared. These specimens were subjected to a diffusion treatment of heating at 600° C. for 24 hours in the same way as in Example 1, and ultralow-loss glasses of Examples 2 to 8 were thus obtained.

Scattered light intensity of the ultralow-loss glasses of Examples 2 to 8 at a scattering angle of 90° were measured by using the argon laser of 488 nm. The scattered light intensity of these examples at room temperature are also shown in FIG. 1 and Table 1.

TABLE 1

|  | Na$_2$O CONCENTRATION (wt. ppm) | SCATTERED LIGHT INTENSITY (arbitrary intensity) |
| --- | --- | --- |
| Ex. 1 | 50 | 25,500 |
| Ex. 2 | 40 | 25,800 |
| Ex. 3 | 30 | 26,000 |
| Ex. 4 | 20 | 26,400 |
| Ex. 5 | 15 | 26,500 |
| Ex. 6 | 10 | 27,300 |
| Ex. 7 | 5 | 27,900 |
| Ex. 8 | 1 | 30,000 |
| Com. Ex. 1 | <0.01 | 30,500 |

As apparent from FIG. 1 and Table 1, by adding 1 wt.ppm Na$_2$O, the scattered light intensity was decreased from 30,500(A.U.) to 30,000(A.U.), and by adding Na$_2$O in amounts of 5 wt.ppm, 10 wt.ppm, 15 wt.ppm, 20 wt.ppm, 30 wt.ppm, 40 wt.ppm, 50 wt.ppm, respectively, the scattered light intensity was further decreased to 27,900(A.U.), 27,300(A.U.), 26,500(A.U.), 26,400(A.U.), 26,000(A.U.), 25,800(A.U. ), and 25,500(A.U.).

Possibility of Industrial Utilization

As discussed above, since light scattering, which remarkably increases transmission losses, is minimal, the ultralow-loss silica glass of the present invention is superior as a base material of a glass fiber for long-distance transmission. In addition, since the present inventive glass can be produced only by adding a very small amount of at least one modifying oxide to silica glass, the present production line in the vapor-phase axial deposition method (the soot method) of producing silica glass preforms can be utilized only by being changed slightly. This is a big advantage of the present invention.

What is claimed is:

1. An optical fiber formed of ultralow-loss glass which is composed of silica glass containing at least one network modifying oxide in an amount of 1 to 500 wt.ppm, said network modifying oxide being at least one member selected from the group consisting of Na$_2$O, K$_2$O, Li$_2$O, MgO CaO, and PbO.

2. An optical fiber according to claim 1, wherein said ultralow-loss glass is used as a core, or as a core and a cladding.

* * * * *